Figure 2:
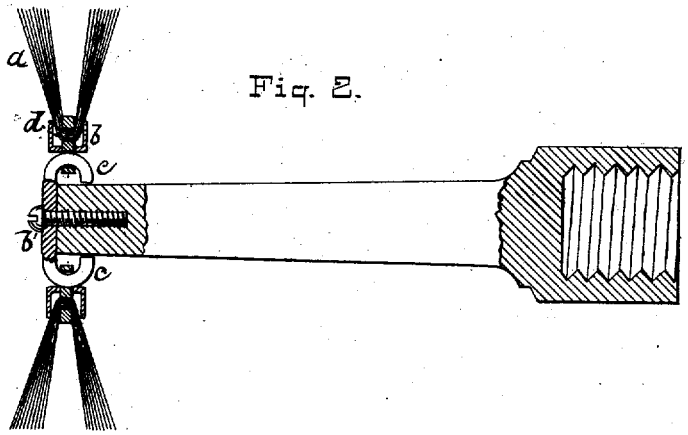
Figure 1:
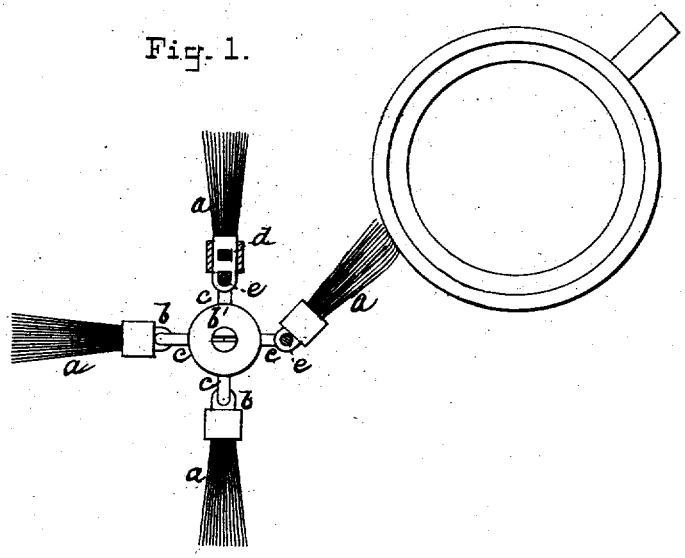

R. DIMES.

Assignor to Tiffany & Co.

PROCESS AND APPARATUS FOR STIPPLING METALLIC SURFACES.

No. 7,658. Reissued May 1, 1877.

ATTEST:

Robert Moon

James H. Hunter

INVENTOR:

Richard Dimes

N. PETERS, PHOTO-LITHOGRAPHER, WASHINGTON, D. C.

UNITED STATES PATENT OFFICE.

RICHARD DIMES, OF NEW YORK, N. Y., ASSIGNOR TO TIFFANY & CO., OF SAME PLACE.

IMPROVEMENT IN PROCESSES AND APPARATUS FOR STIPPLING METALLIC SURFACES.

Specification forming part of Letters Patent No. 128,290, dated June 25, 1872; reissue No. 5,378, dated April 29, 1873; reissue No. 7,658, dated May 1, 1877; application filed April 17, 1877.

DIVISION C.

*To all whom it may concern:*

Be it known that I, RICHARD DIMES, of the city, county, and State of New York, have invented certain new and useful Improvements in Finishing the Surfaces of Metals; and I do hereby declare that the following is a full, clear, and exact description of the same.

This invention relates to the process of stippling, satin or pearl finishing of the surfaces of silverware and other goods composed of metal or containing metallic surfaces. This surface is produced by the rapid impingement thereon of the points of a number of fine wires. These wires are to be so constructed and manipulated that in their operation they will only strike the surface to be satin or pearl finished on their points, and with a spring-like or rebounding movement after each impingement upon the surface. In case the wires are not so constructed and manipulated that they will strike the surface on their points, but, instead thereof, on their sides, or without a rebound or spring-like action after each impingement upon the surface, so as to immediately free themselves from such surface after contact, they will produce upon such surface a swash-like or scratched-up appearance.

In the drawing is shown one mode of attaching these fine wires, so that their points only will, in the manipulation of such wires, impinge on the surface to be satin or pearl finished without interference with each other, and with a rebound or spring-like action, thereby avoiding any dragging or scratching of the points over the surface.

*a a*, &c., are the fine wires. They are here shown attached to loops *b b*, &c., placed at intervals on the chuck-head *b'* by means of intermediate links *c c*, &c., the wires passing in bunches through the eyes *d d*, &c., of these intermediate links, these links being, in turn, secured loosely by their eyes *e e*, &c., to the loops *b b*, &c.

The brush thus constructed is to be revolved by suitable mechanism. If the surface of the article to be satin-finished is held in such a position that these stippling-wires will strike it, the points only will produce indentations or marks on the surface of the article, and the links will enable such points to yield sufficiently, so as to pass the surface immediately after they have struck it, and so as to only indent, and not to scratch or otherwise mar it.

The surface of the article thus presented to the action of the stippling-points will in this manner be quickly covered with minute indentations, whereby a stippled satin or pearl finished appearance of great beauty is obtained at a small cost.

This construction gives, on the rotation of the brush, a yielding or elastic movement to the body of wires, so that they will strike the surface to be satin-finished on their points, each wire without interference of others, and so that each wire, after it has once struck the surface, will immediately free itself without interference with the other wires until it again comes round and in contact with such surface, such as would be the case if the rotating brush were only composed of a few elastic radial wires of considerable length, and separated sufficiently from each other that, when they respectively strike the surface to be finished, they perform their office before other wires following have an opportunity to interfere with them or their field of operation.

In the case of the use of a solid brush of wires like the ordinary scratch-brush, it will be seen that this satin-finish cannot be performed, as the close body of wires will not admit of the free action or vibration of the respective points of the wires—that is, there being an interference of the wires with each other—thereby causing the wires to act on their sides as well as on their points, and the points to act continuously upon the surface instead of simple infringement thereon and indentation thereof, and thus giving on the surface to be produced only an ordinary brush-like action or scratched-up and swash-like surface called in the arts "scratch-brush finish," and not having the pearly and satin-like hue and appearance of my improved surface.

I claim—

The process of stippling satin or pearl finishing by the impingement upon the surface required to be finished, without interference with each other, of the points of a number of fine wires, substantially as described.

RICHARD DIMES.

Witnesses:

ROBERT MOORE,
JAMES H. HUNTER.